United States Patent
Pitchford

Patent Number: 5,458,430
Date of Patent: Oct. 17, 1995

[54] CLAMP RING

[75] Inventor: Trevor Pitchford, Bolton, England

[73] Assignee: Eaton Corporation, Cleveland, Ohio

[21] Appl. No.: 151,619

[22] Filed: Nov. 15, 1993

[30] Foreign Application Priority Data

Dec. 1, 1992 [GB] United Kingdom ............ 9225085

[51] Int. Cl.⁶ ........................................ F16B 2/24
[52] U.S. Cl. .................... 403/261; 403/256; 403/247; 403/359; 403/DIG. 7
[58] Field of Search ...................... 403/359, 319, 403/366, 365, 372, 375, DIG. 7, 41, 344, 261, 256, 247; 74/595, 597, 598, 432, 434; 474/903

[56] References Cited

U.S. PATENT DOCUMENTS 3,750,489  8/1973  Caldwell .......................... 74/434
4,019,824  4/1977  Percy ............................. 403/261

FOREIGN PATENT DOCUMENTS 1419615  10/1965  France ........................... 403/261
 814988   7/1949  Germany ......................... 403/261
 549108  11/1942  United Kingdom ................. 74/595

*Primary Examiner*—Anthony Knight
*Attorney, Agent, or Firm*—Howard D. Gordon

[57] ABSTRACT

A gear (5) can set up a high intermittent or continuous axial thrust in operation, whether shifting or driving operation. A single split circular spring clip (3) in a groove on the gearshift (2) can tend to yield by expansion under such a load. Accordingly a further split circular spring reinforcement ring (7) having a conical surface (10) facing the gear (5), is abutted by, preferably, a matching conical surface (13) which is moved with the gear (5). The abutting of the reinforcement ring (7) causes the ring to contract around the gearshaft (2), increasing friction and consequently, the resistance axial movements.

8 Claims, 2 Drawing Sheets

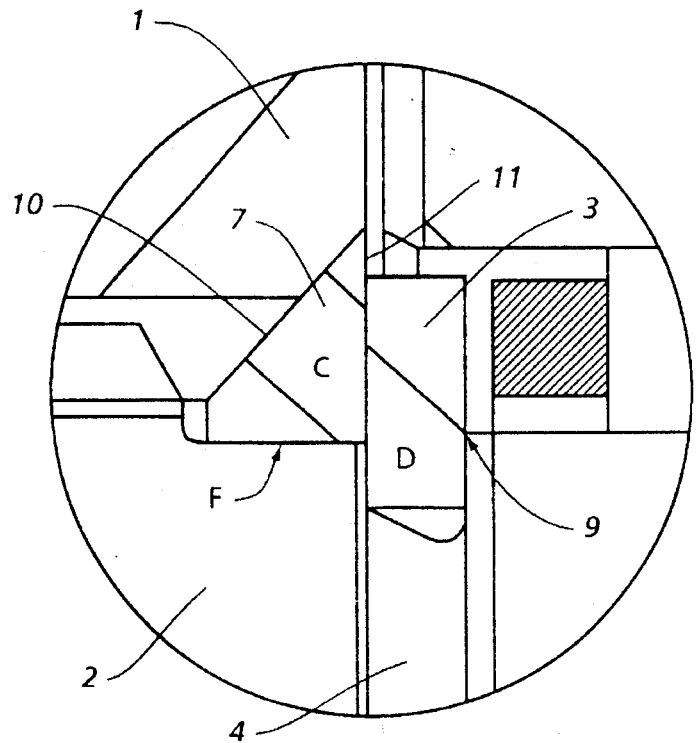
FIG. 2
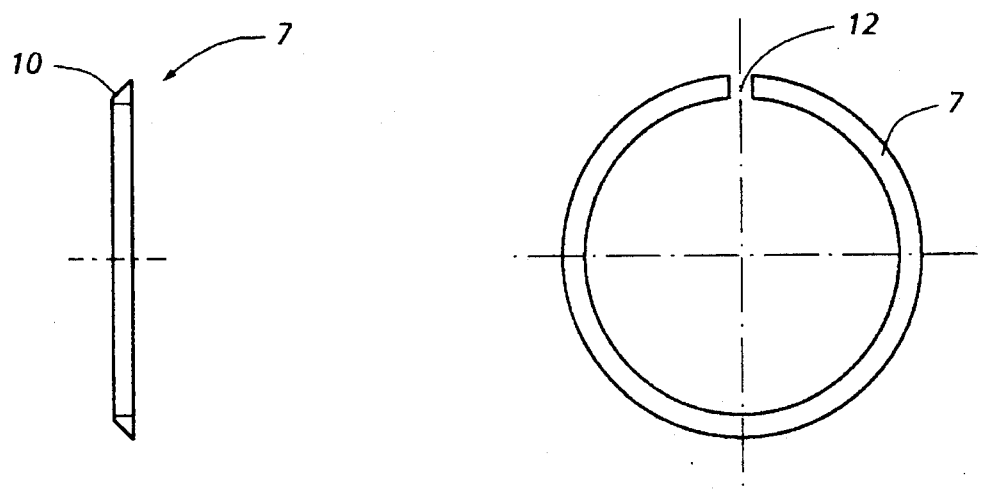
FIG. 3A
FIG. 3B

CLAMP RING

This invention relates to a detachable clamp ring for gripping a cylindrical object such as a shaft so as to resist axial movements caused by side thrusts or forces. Circular spring clips in grooves are well known detachable clamp rings, but they tend to yield with axial thrust and even to become opened and detached thereby.

Gears to be installed and detached from shafts from time to time, and especially when held radially only by other gears such as fixed countershaft gears, especially exhibit this problem. The side thrusts occur more or less continuously due to their teeth being inclined to the axes, and abruptly, when shifts take place and splines or dogs are suddenly engaged by an axial movement. Such movements are transmitted as thrust to constant mesh rotatingly mounted gears, tending to lead to their unwanted and unpredictable movements or aforementioned straining on such state of the art axial restraining devices as clamp rings formed by split circular spring clips.

Accordingly the invention proposes that a wheel, especially a gearwheel in a shift box, mounted on a shaft with an axial restraint be reinforced by a split conically surfaced clip (7) that is sandwiched directly or through washers or compression rings etc between the restraint and the wheel, and hence abuts the axial restraint to be reinforced; the wheel either abutting the conical surface itself or arranged to thrust on the conical surface indirectly through washers or the like.

An embodiment of the invention will now be described in conjunction with the drawings, in which:

FIG. 2 shows a magnified detail of FIG. 1; and

FIG. 3 (a–b) shows a reinforcing clip following the inventive teaching.

Figure 1:
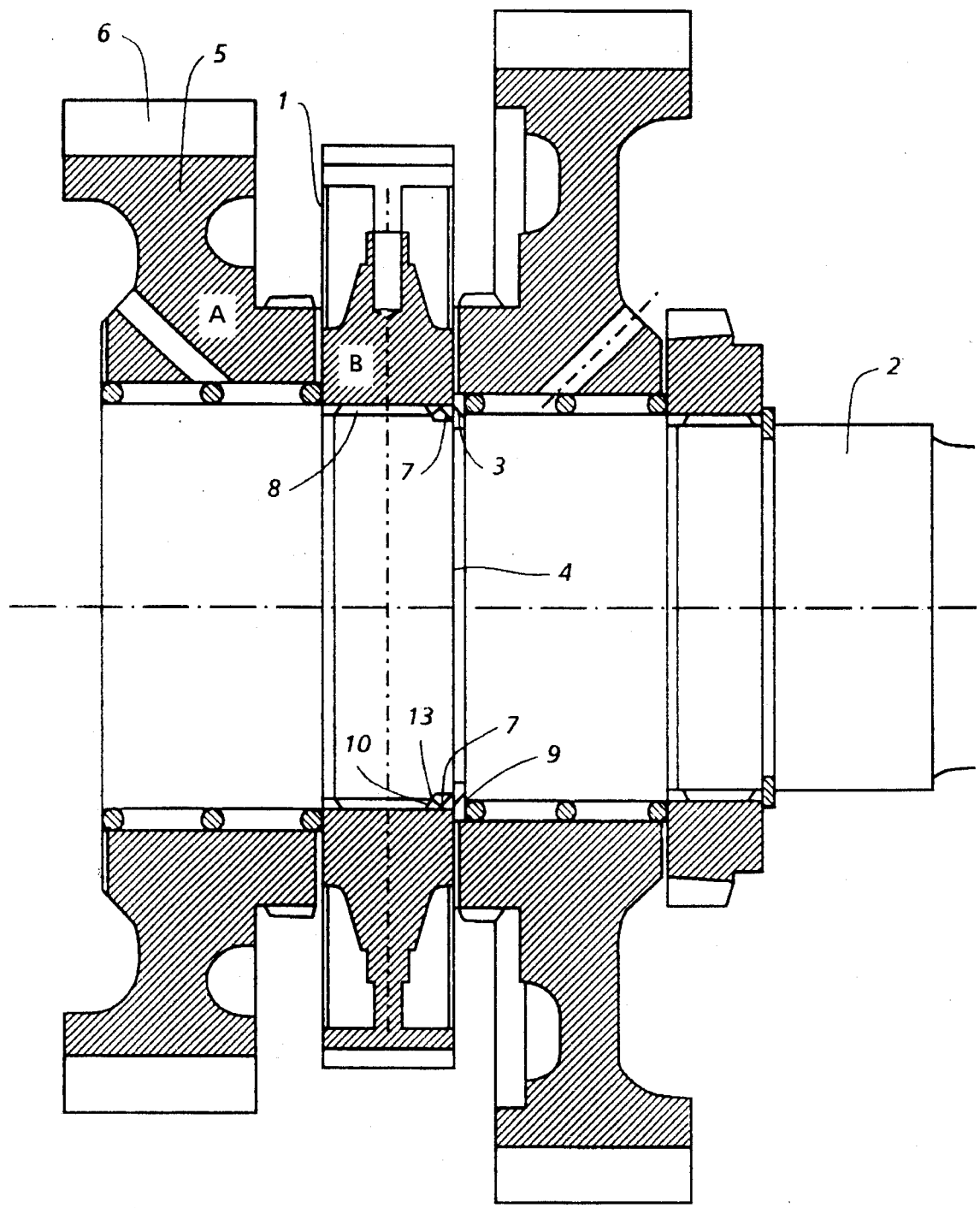
FIG. 1 shows a side sectional view of gears on a shaft, and the restraint of the invention.

Referring to FIG. 1, a hub 1 is fixed on a shaft 2 against rightward movement, by means of a circular spring clip 3 which fits into a circumferential groove 4 in the shaft 2. Rightward thrust is caused by the axial thrust load applied in operation to a gear 5 which rotatingly abuts the hub 1. Permanent fixtures are undesirable because the parts are desired to be dismantled and refitted periodically, preferably to all being discarded or broken for routine or breakdown servicing. The thrusts can arise through sliding engagement of dog teeth (not shown), or normal driving of inclined or helical teeth at 6.

If gear 5 pushes rightward, the circular clip 3 tends to yield resiliently axially, pivoting about an annular shoulder or corner 9 of the shaft 2, eg a mainshaft. Such yielding is unwanted, rendering the axial position of the gear 5 uncertain, and can cause wear, breakages, circumferential expanding or exiting of the clip 3 from groove 4.

Accordingly a reinforcing split clip 7 is arranged to surround the shaft 2 in abutting relationship with the circular clip 3. Clip 7 is also circular and split at 12, but it is not used for spring or resilient characteristics (which it may or may not possess). Clip 7 presents a planar surface to abut the spring clip 3 to its right, and a conical or inclined surface 10 to receive thrust, preferably direct abutment from the hub 1 to the left (which hub itself is thrust rightwards by gear 5). For this purpose of delivering thrust efficiently to the outwardly facing conical surface 10, there may be a conforming inwardly facing conical surface (13) on the hub (1). Otherwise there may be a less desirable line contact of abutment. Surface 13 contracts reinforcing clip 7 on the shaft.

The hub 1 may slide axially on splines so its radial position is fairly constant. Therefore it thrusts on clip 7 about half way up its inclined surface 10, tending to close this reinforcing clip and to clamp it hard on the shaft. The axial thrust is thus converted to an inwards radial thrust. Axial frictional resistance is correspondingly increased. The spring clip 3 is thus axially relieved. It must absorb an initial axial thrust of enough force to start the radial contraction of the reinforcing clip, but such force need be only a small fraction of the whole axial thrust which as in the prior art it would otherwise receive and have to withstand. Also the annular shoulder 9 of the mainshaft 2 does not receive much thrust, or tend to wear or cause annular flexing of the spring 3.

Referring to FIG. 2, spring clip 3 can be seen abutting annular shoulder or corner 9, and abutted by conical reinforcing clip 7 of which the inclined face 10 receives axial thrust from hub 1. The axial thrust is initially resolved into an axial onward thrust on the clip 3 and annular shoulder 9, and a radial inward thrust onto the shaft 2 thereby increasing a frictional restraining force by the shaft on the reinforcing clip. Increasing rightwards force increases this radial inward thrust and this resulting frictional restraint, the split reinforcing clip being forced into a less split shape with reduced diameter. The spring clip 3 and the shoulder 9 are correspondingly relieved.

The angle of inclination of conical surfaces 10 and 13, must be optimized empirically to give satisfactory inward thrust on ring 7. When required for service and maintenance, dismounting the gear relieves the inward pressure on the reinforcing clip, and disassembling all parts becomes simple. A shallower groove 4 and/or a more resilient clip 3 may in many cases be perfectly safe. Otherwise the sideways resistance of the clip pair, and reliability, are increased. Any flexing of the spring clip can thus allow excessive movement of the fixed hub when subjected to high continuously or intermittently applied axial loads, without the advantages of the invention. The non-limiting embodiment thus provides that resistance to axial thrust of a primary abutment device, such as spring clip (3), be reinforced by an auxiliary reinforcing split clip (7) which presents a flattish surface (11) towards the spring clip (3) and a conical surface (10) towards the direction of incidence of the thrusting source (5,1).

Numerous alternatives falling within the ambit of the appended claims will readily occur to the skilled person, without departures from the spirit and scope of the invention.

What is claimed is:

1. A clamping combination for a body (1) mounted on an elongated member (2) to have exceptionally a measure of sliding freedom thereon, but normally to be required to be restrained from such sliding freedom, said combination comprising a clamp ring (3) adapted to be mounted on and to engage detent means (4,9) of the elongated member (2) and thereby to be able to exert an initial axial restraint, and a contractable reinforcement ring (7) having a conical surface (10) facing outwardly from the elongated member (2) and adapted to be mounted between the body (1) and the clamp ring (3), such that axial movements of the body (1) toward the clamp ring (3) are resisted by an abutment on the conical surface (10) of the reinforcement ring (7) whereby the latter and grips more tightly around the elongated member (2).

2. A clamping combination according to claim 1 wherein the reinforcement ring (7) is able to contract by virtue of a circumferential split (12).

3. A clamping combination according to claim 1 wherein said detent means includes a circumferential groove (4) in the elongated member (2).

4. A clamping combination according to claim 1 wherein said detent means is an annular shoulder (9) on the elongated member and facing the body (1).

5. A clamping combination according to claim 3 wherein said clamp ring is a split circular spring clip (3) accommodated within said groove (4) in the elongated member (2).

6. A clamping combination according to claim 4 wherein said clamp ring is a split circular spring clip (3) able to abut against said annular shoulder (9).

7. A clamping combination according to claim 6, wherein the body is a hub (1) splined to a main shaft (2) in a transmission and rotatably abutted in gear-shifting or in continuous driving operation by a gear (5).

8. A clamping combination comprising a hub (1) mounted axially slidably on a shaft (2), but normally required to be restrained from sliding freedom, said combination comprising detent means (4, 9) on the shaft (2), a clamp ring (3) mounted on and engaging the detent means (4, 9) and thereby exerting an initial axial restraint to the clamp ring (3), and a contractable reinforcement ring (7) mounted between the body (1) and the clamp ring (3) and having a conical surface (10) facing outwardly from the elongated member (2), such that axial movements of the body (1) toward the clamp ring (3) are resisted by an abutment on the conical surface (10) of the reinforcement ring (7) whereon the latter contracts around the elongated member (2), thereby gripping more tightly around the elongated member (2), whereby restraint of the reinforcement ring (7) to axial movements is substantially increased.

* * * * *